(12) United States Patent
Hiraoka (10) Patent No.: US 9,149,029 B2
(45) Date of Patent: Oct. 6, 2015

(54) SPINNING REEL

(71) Applicant: Shimano Inc., Osaka (JP)

(72) Inventor: Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 71 days.

(21) Appl. No.: 14/107,200

(22) Filed: Dec. 16, 2013

(65) Prior Publication Data

US 2014/0203131 A1 Jul. 24, 2014

(30) Foreign Application Priority Data

Jan. 21, 2013 (JP) ................................. 2013-008341

(51) Int. Cl.
*A01K 89/01* (2006.01)
(52) U.S. Cl.
CPC .................................. *A01K 89/0114* (2013.01)
(58) Field of Classification Search
CPC .............................................. A01K 899/0114
USPC ................................................. 242/278, 279
See application file for complete search history.

(56) References Cited

U.S. PATENT DOCUMENTS

| 5,503,345 | A | * | 4/1996 | Kaneko | 242/279 |
| 5,890,668 | A | * | 4/1999 | Hitomi | 242/241 |
| 5,984,220 | A | * | 11/1999 | Kawabe | 242/241 |
| 2003/0047633 | A1 | * | 3/2003 | Kitajima | 242/278 |
| 2009/0072066 | A1 | * | 3/2009 | Saito | 242/273 |
| 2010/0187346 | A1 | * | 7/2010 | Ochiai et al. | 242/242 |

FOREIGN PATENT DOCUMENTS

| EP | 0701775 A1 * | 9/1995 | .............. A01K 89/01 |
| JP | 09238602 A * | 9/1997 | .............. A01K 89/01 |
| JP | 5008321 B2 | 6/2012 | |

OTHER PUBLICATIONS

European Search Report of corresponding EP Application No. 14 15 1350.7 dated Apr. 23, 2014.

* cited by examiner

*Primary Examiner* — Emmanuel M Maecelo
(74) *Attorney, Agent, or Firm* — Global IP Counselors (57) ABSTRACT

A spinning reel includes a handle, a reel unit, a rotor, a spool, a spool shaft, and an oscillating mechanism. The oscillating mechanism includes a traverse cam and a slider including a slider body, a through hole, an engaging member, a first bearing, and a retainer member. The slider body is coupled to the spool shaft. The engaging member has a shaft part and an engaging part. The engaging part is mounted to a tip end of the shaft part to be engaged with helical grooves. The first bearing has a fitted part, a protruding part, and a support hole. The fitted part is fitted into the through hole. The protruding part has a diameter smaller than a diameter of the fitted part. The fitted part includes a stepped surface on an end thereof abutting the protruding part. The retainer member retains the first bearing at the stepped surface.

11 Claims, 9 Drawing Sheets

SPINNING REEL

CROSS-REFERENCE TO RELATED APPLICATIONS

This application claims priority to Japanese Patent Application No. 2013-008341 filed on Jan. 21, 2013. The entirety disclosure Japanese Patent Application No. 2013-008341 is hereby incorporated herein by reference.

BACKGROUND

1. Field of the Invention

The present invention relates to a spinning reel, and particularly to an oscillating mechanism for a spinning reel, which is configured to reciprocate a spool back and forth in conjunction with rotation of a handle.

2. Background Art

Spinning reels are provided with an oscillating mechanism configured to reciprocate a spool back and forth in conjunction with rotation of a handle. The oscillating mechanism includes a traverse can shaft and a slider. Helical grooves, which intersect with each other, are formed on the traverse cam shaft. The slider can unitarily move a spool at least in the axial direction. A pinion gear, which is meshed with a drive gear produced in the form of a face gear, is rotatably mounted to the outer peripheral side of the spool shaft. Therefore, the slider is disposed adjacently to the drive gear, while avoiding interference with the drive gear.

The slider includes a slider body and an engaging member. The spool shaft is coupled to the slider body. The engaging member is engaged with the helical grooves, and is configured to reciprocate the slider body back and forth by rotation of the traverse cam shaft. The engaging member is attached to the interior of the slider body, while being rotatable about an axis perpendicular to the traverse cam shaft.

SUMMARY

A well-known oscillating mechanism has a structure that a shaft part of the engaging member is rotatably supported by a bearing within the slider (see Publication of Japan Patent No. 5008321). In the well-known oscillating mechanism, a retainer member for retaining the bearing is disposed in contact with an end of the bearing. The retainer member is fixed to the slider body by a screw member.

It can be considered to further smoothly rotate the engaging member in order to improve the oscillating mechanism. Specifically, when tilted, the engaging member is unlikely to be smoothly rotated even with use of a bearing. This is attributed to the fact that the engaging member is rotated to a great extent on the both ends of the helical grooves of the traverse cam shaft. In view of the above, there is an idea to prolong the shaft part of the engaging member that is supported by the bearing. When the shaft part is prolonged, the engaging member is less easily tilted. The engaging member can be thereby further smoothly rotated. However, when the shaft part is prolonged in the well-known oscillating mechanism, the width (i.e., the length along the axial direction of the shaft part) of the slider body disposed adjacently to the drive gear is inevitably increased. This brings increase in size of the reel.

It is an advantage of the present invention to increase the length of a shaft part of an engaging member as much as possible without increasing the width of a slider body in a spinning reel.

A spinning reel being configured to forwardly reel out a fishing line includes a handle, a reel unit, a rotor, a spool, a spool shaft, and an oscillating mechanism. The reel unit rotatably supports the handle. The rotor is rotatably supported by the reel unit. The spool has a bobbin trunk about which the fishing line is wound by the rotor. The spool is mounted on the spool shaft. The oscillating mechanism is configured to reciprocate the spool in a back-and-forth direction by a rotation of the handle. The oscillating mechanism includes a traverse cam and a slider. The traverse cam shaft has intersecting helical grooves on a surface thereof. The traverse cam shaft is disposed in parallel to the spool shaft. The traverse cam shaft is configured to be rotated in conjunction with the rotation of the handle. The slider includes a slider body, a through hole, an engaging member, a first bearing, a retainer member, and a fixation member. The through hole penetrates the slider body in a direction perpendicular to the traverse cam shaft. The slider body is coupled to the spool shaft to be unitarily movable therewith at least in an axial direction. The engaging member has a shaft part and an engaging part. The engaging part is mounted to a tip end of the shaft part to be engaged with the helical grooves. The engaging member is formed in a rod shape in order for a rear end of the shaft part to protrude out of the through hole. The first bearing has a fitted part, a protruding part, and a support hole. The fitted part is fitted into the through hole. The protruding part has a diameter smaller than a diameter of the fitted part. The fitted part includes a stepped surface on an end thereof abutting the protruding part. The protruding part protrudes out of the through hole. The support hole penetrates through the fitted part and the protruding part. The support hole rotatably supports the shaft part. The retainer member retains the first bearing at the stepped surface. The fixation member fixes the retainer member to the slider body.

BRIEF DESCRIPTION OF THE DRAWINGS

Referring now to the attached drawings which form a part of this original disclosure.

DETAILED DESCRIPTION OF THE PREFERRED EMBODIMENT

Entire Structure

Figure 1:
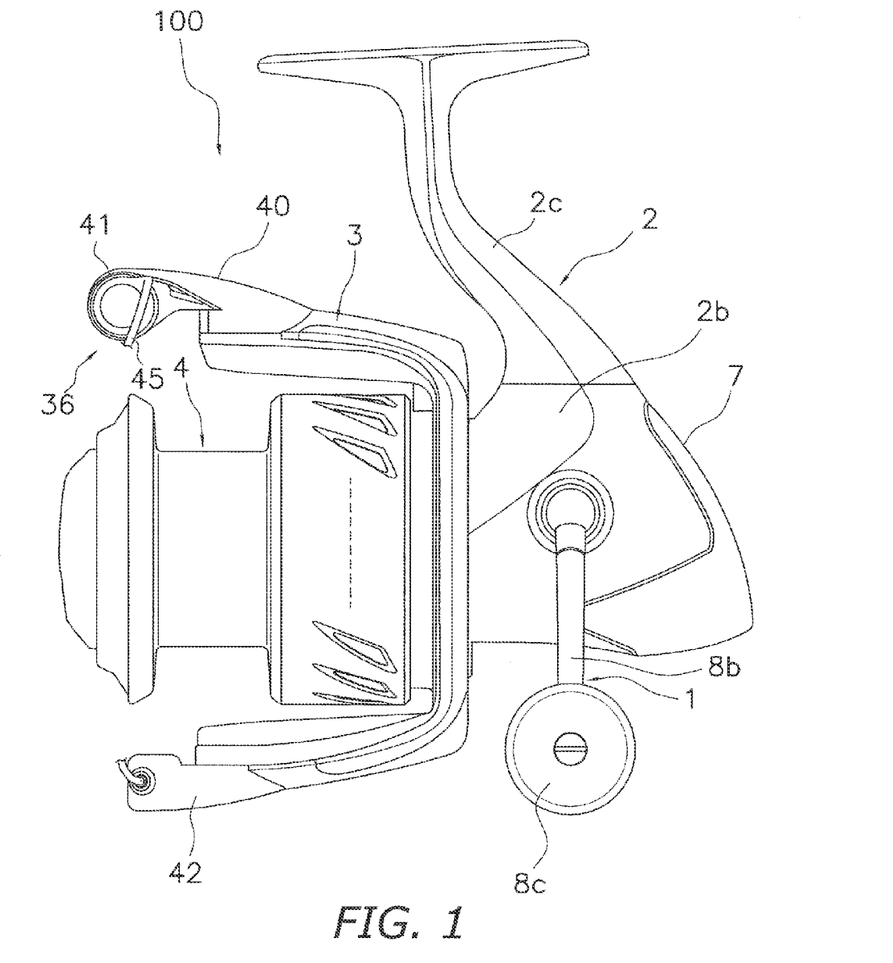
FIG. 1 is a side view of a spinning reel according to an exemplary embodiment of the present invention.
Figure 2:
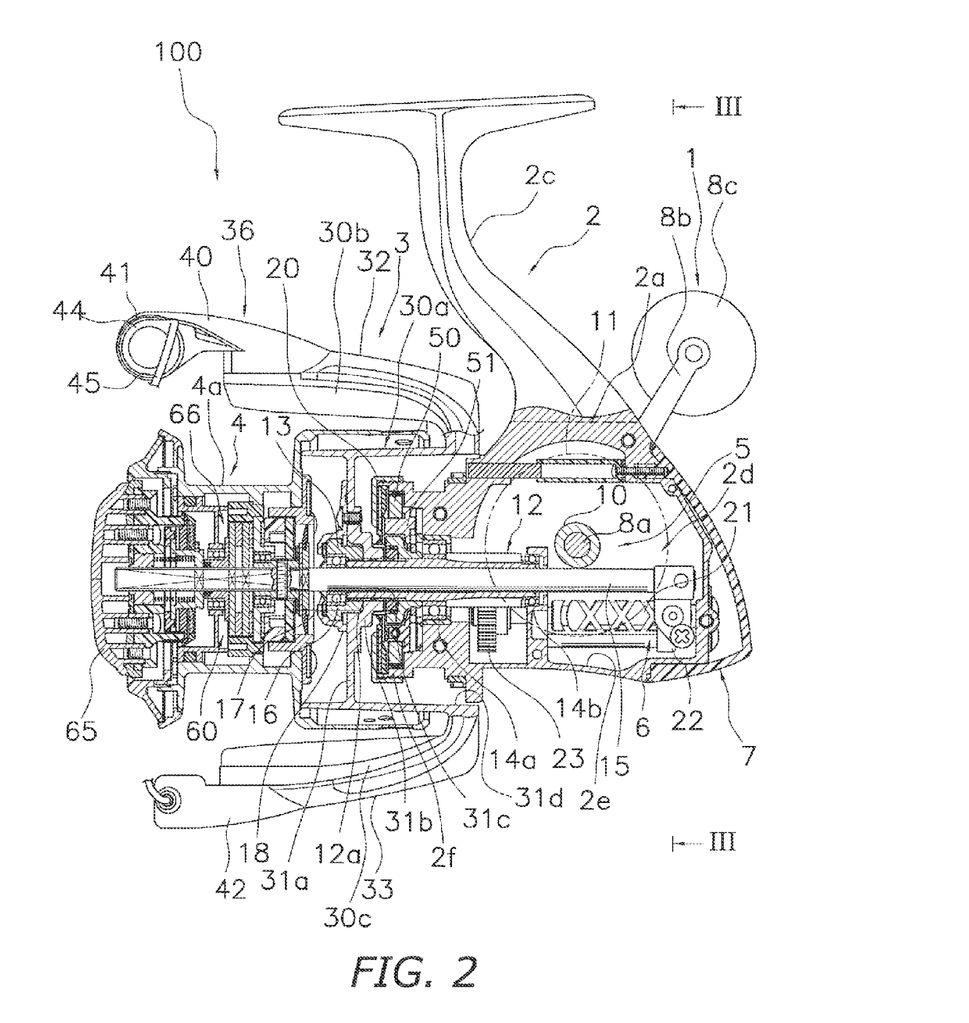
FIG. 2 is a cross-sectional side view of the spinning reel.
Figure 3:
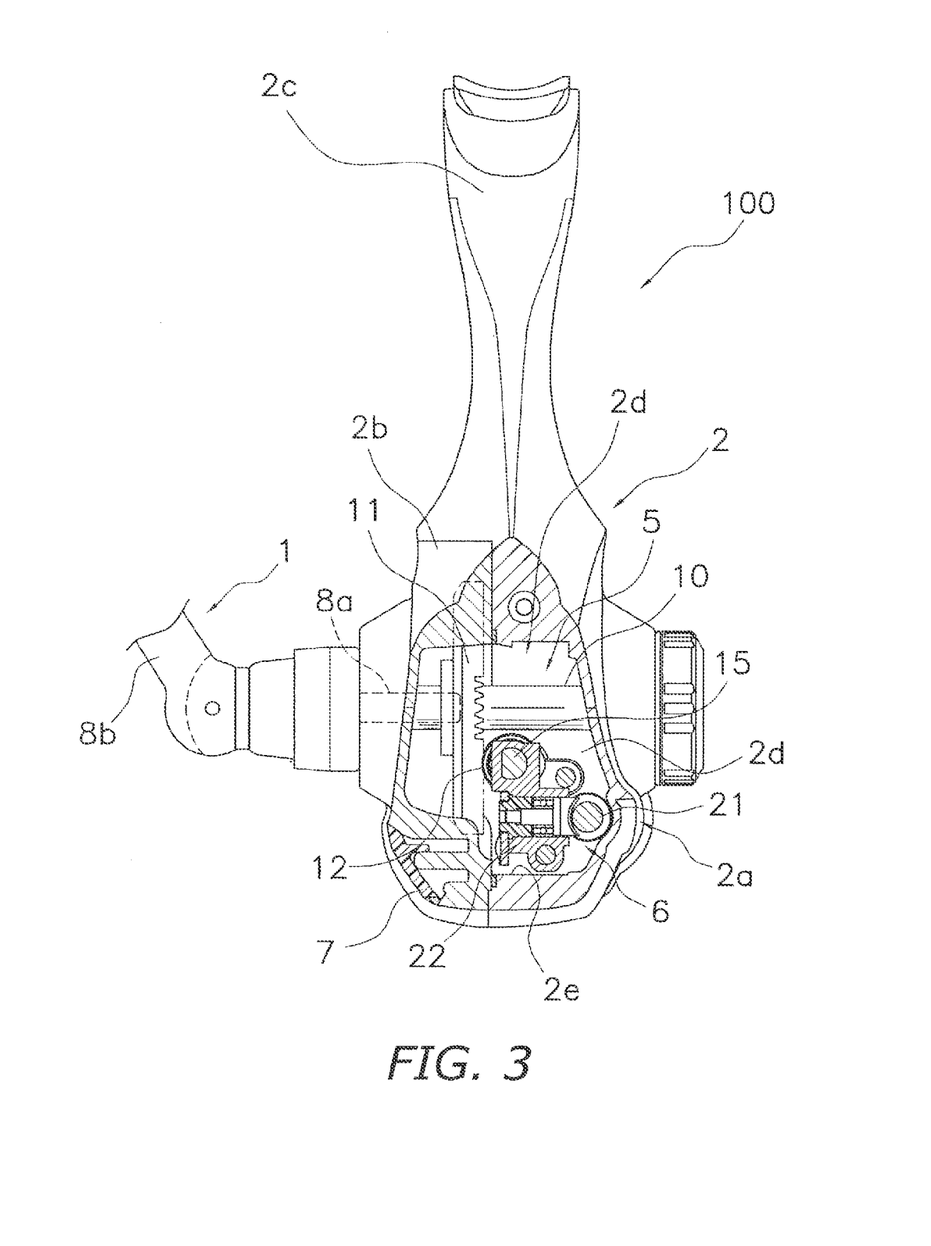
FIG. 3 is a cross-sectional view of FIG. 2 taken along a cutaway line III-III.

In FIGS. 1, 2, and 3, a spinning reel 100 according to an exemplary embodiment of the present invention is configured to forwardly reel out a fishing line. The spinning reel 100 includes a reel unit 2, a rotor 3, a spool 4, a spool shaft 15, a rotor drive mechanism 5, and an oscillating mechanism 6. The reel unit 2 rotatably supports a handle 1. The rotor 3 is rotatably supported at the front of the reel unit 2. The spool 4 has a bobbin trunk 4*a* that the fishing line is wound thereabout by the rotor 3. The spool 4 is disposed at the front of the rotor 3, while being movable back and forth. The spool 4 is mounted to the tip end of the spool shaft 15. The oscillating mechanism 6 is configured to reciprocate the spool 4 back and forth through the spool shaft 15 by the rotation of the handle 1. It should be noted that the handle 1 is attachable to either the left side (see FIGS. 1 and 3) or the right side of the reel unit 2.

As illustrated in FIGS. 1 and 2, the handle 1 is pivotably attached to the tip end of a handle shaft 8a (see FIG. 2), and includes a handle arm 8b, a knob shaft (not illustrated in the figures), and a handle knob 8c. The handle arm 8b extends in a direction intersecting with the handle shaft 8a. The knob shaft is fixed to the tip end of the handle arm 8b. The handle knob 8c is rotatably attached to the knob shaft.

Structure of Reel Unit

The reel unit 2 includes a chassis 2a, a lid member 2b, a fishing rod attachment leg 2c, and a reel unit guard 7. The chassis 2a is made of aluminum alloy or magnesium alloy, for instance, and contains a mechanism attachment space 2d with an opening. The rotor drive mechanism 5 and the oscillating mechanism 6 are disposed in the mechanism attachment space 2d. The rotor drive mechanism 5 is configured to rotate the rotor 3 in conjunction with the rotation of the handle 1. The fishing rod attachment leg 2c serving to attach a fishing rod thereto is integrally formed with the chassis 2a. Further, a tubular portion 2f is formed in the front part of the chassis 2a.

The lid member 2b is made of for instance, aluminum alloy or magnesium alloy. The lid member 2b is provided for closing the mechanism attachment space 2d by covering the aforementioned opening 2e of the mechanism attachment space 2d. The fishing rod attachment leg 2c is a roughly T-shaped portion that extends forwards from the chassis 2a in an obliquely upward direction and is then extending in the back-and-forth direction. In the present exemplary embodiment, the fishing rod attachment leg 2c is integrally formed with the chassis 2a. However, the fishing rod attachment leg 2c can be integrally firmed with the lid member 2b. The reel unit guard 7 covers the rear surface, the rear part lateral surface, and the rear part bottom surface of the chassis 2a and those of the lid member 2b.

Structure of Rotor Drive Mechanism

As illustrated in FIGS. 2 and 3, the rotor drive mechanism 5 includes a drive shaft 10, a drive gear 11, and a pinion gear 12. The handle shaft 8a of the handle 1 is coupled to the drive shaft 10, while being unitarily rotatable therewith. The drive gear 11 is made in the form of a face gear, and is configured to be rotated together with the drive shaft 10. The pinion gear 12 is meshed with the drive gear 11. The drive shaft 10 is, for instance, a tubular shaft made of stainless alloy. The both ends of the drive shaft 10 are supported by bearings (not illustrated in the figures) attached to the chassis 2a and the lid member 2b. The drive shaft 10 has female threaded portions (not illustrated in the figures) formed on the both ends of the inner peripheral surfaces thereof. The drive gear 11 is made in the form of a face gear, for instance, and is mounted onto the drive shaft 10 while being unitarily rotatable therewith. In the present exemplary embodiment, the drive gear 11 is detachably mounted onto the drive shaft 10. It should be noted that the drive gear 11 can be integrated with the drive shaft 10.

The pinion gear 12 is, for instance, a tubular member made of stainless alloy. As illustrated in FIG. 2, a front portion 12a of the pinion gear 12 is fixed to the rotor 3 by a nut 13, while penetrating through the center part of the rotor 3. Thus, the pinion gear 12 is unitarily rotatable with the rotor 3. The nut 13 is prevented from turning by a retainer 18. The retainer 18 is fixed to the rotor 3. The pinion gear 12 is rotatably supported by the chassis 2a through bearings 14a and 14b attached to the chassis 2a at a predetermined interval. Specifically, the bearing 14a supports the axially intermediate portion of the pinion gear 12, whereas the beating 14b supports the axially rear end portion of the pinion gear 12.

Structure of Oscillating Mechanism

Figure 4:
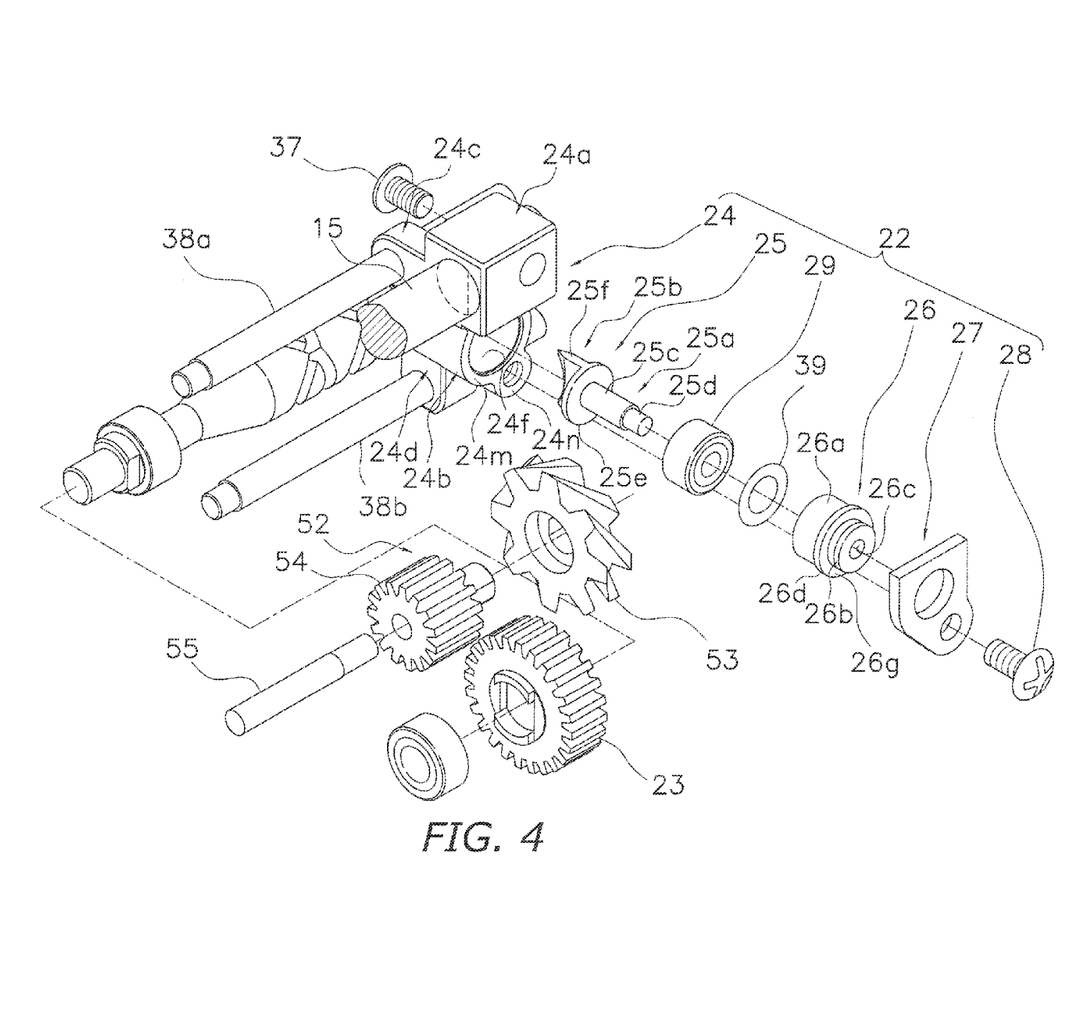
FIG. 4 is an exploded perspective view of an oscillating mechanism.
Figure 5:
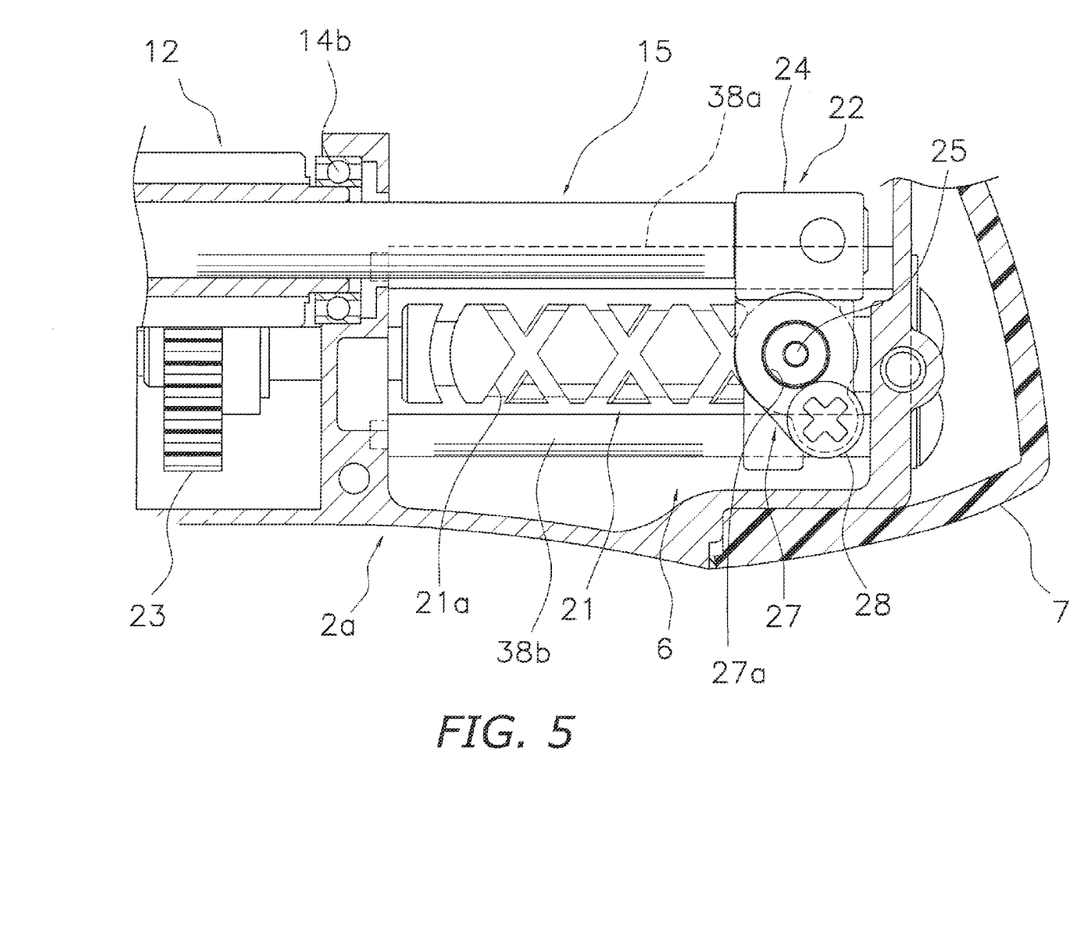
FIG. 5 is an enlarged cross-sectional side view of the oscillating mechanism.
Figure 6:
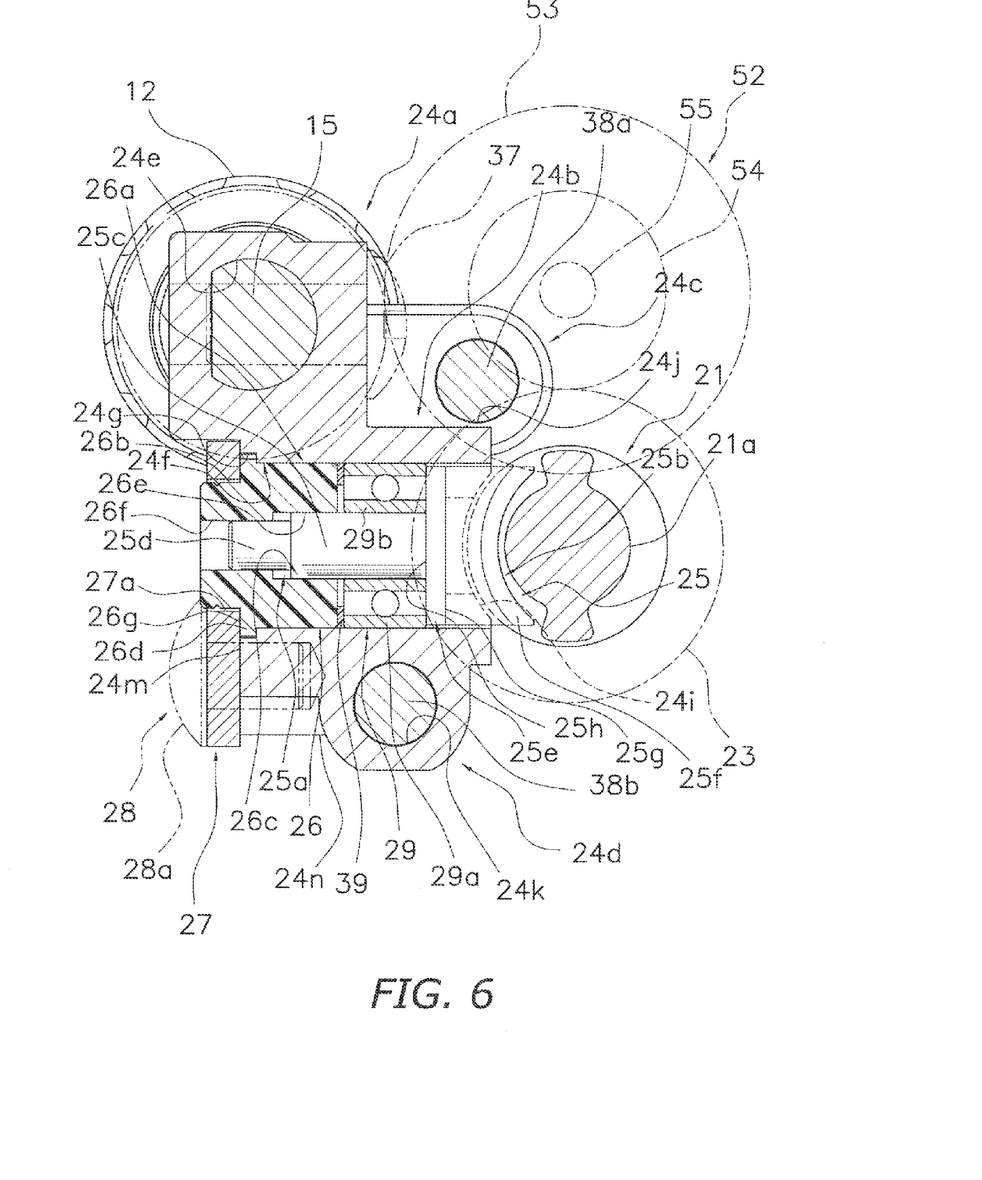
FIG. 6 is an enlarged cross-sectional view of the oscillating mechanism and its periphery in FIG. 3.

As illustrated in FIGS. 2 and 3, the oscillating mechanism 6 is configured to move the spool shaft 15 coupled to the center part of the spool 4 through a drag mechanism 60 in the back-and-forth direction. The spool 4 is thereby configured to be reciprocated in the back-and-forth direction. As illustrated in FIGS. 4, 5 and 6, the oscillating mechanism 6 includes a traverse cam shaft 21, a slider 22, and an intermediate gear 23. The traverse cam shaft 21 is disposed in a position that is lower than and laterally away from the spool shaft 15 (i.e., on the lower right side of the spool shaft 15 in FIG. 6), while being arranged in parallel to the spool shaft 15. The slider 22 is configured to be moved along the traverse cam shaft 21 in the back-and-forth direction. The intermediate gear 23 is mounted onto the tip end of the traverse cam shaft 21, while being unitarily rotatable therewith.

The traverse cam shaft 21 is disposed along the back-and-forth direction, while the both ends thereof are rotatably supported by the chassis 2a through rolling bearings. The traverse cam shaft 21 has intersecting helical grooves 21a on the surface thereof. The traverse cam shaft 21 is configured to be rotated in conjunction with the rotation of the handle 1.

Figure 7:
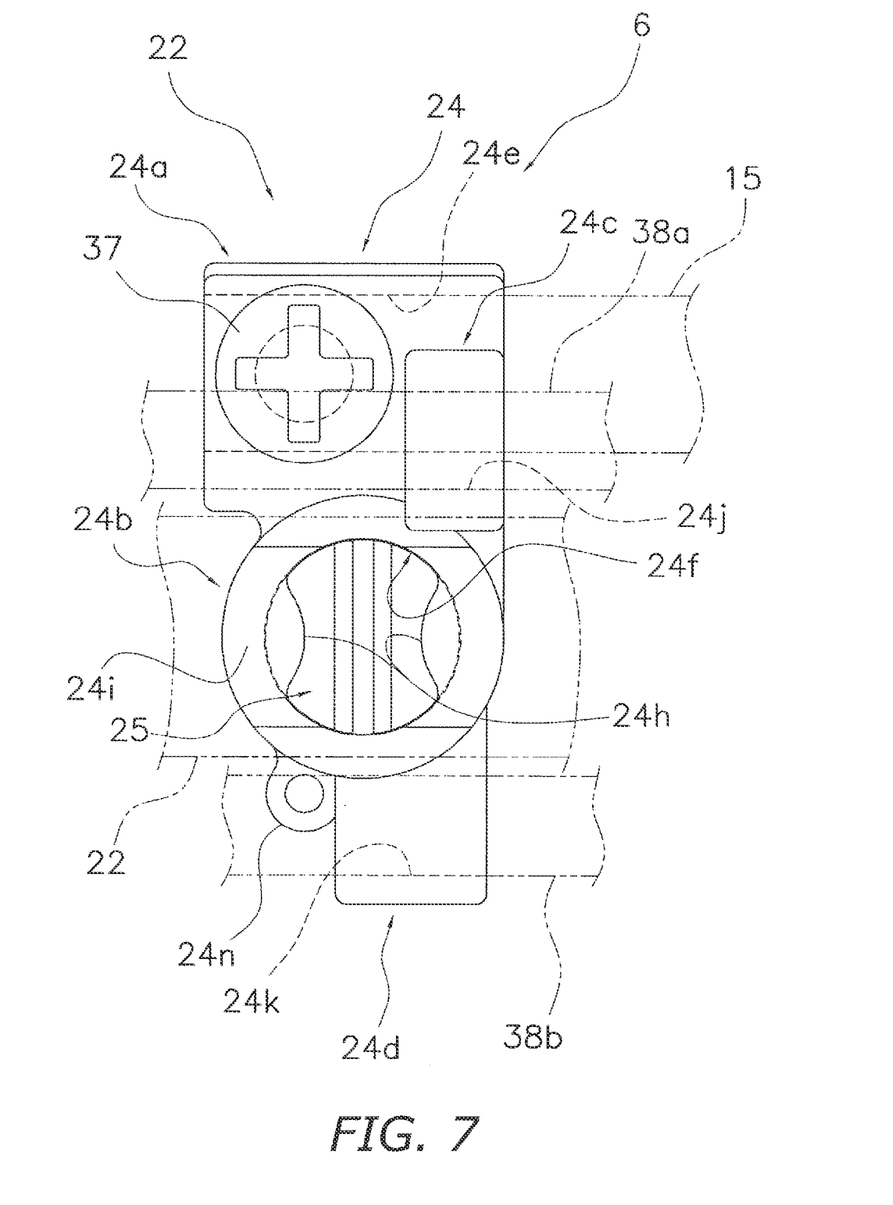
FIG. 7 is a side view of a slider.

As illustrated in FIG. 3, the slider 22 is disposed adjacently to the drive gear 11 meshed with the pinion gear 12 mounted onto the spool shaft 15. As illustrated in FIGS. 4, 6, and 7, the slider 22 includes a slider body 24, an engaging member 25, a first bearing 26, a retainer member 27, a screw member 28 (an exemplary fixation member), and a second bearing 29. The rear end of the spool shaft 15 is non-rotatably fixed to the slider 22. The slider body 24 has a spool shaft coupled portion 24a, an engaging member attached portion 24b, a first guide portion 24c, and a second guide portion 24d. The rear end of the spool shaft 15 is non-rotatably coupled to the spool shaft coupled portion 24a. The engaging member 25 is attached to the engaging member attached portion 24b. The first and second guide portions 24c and 24d serve to guide the slider 22 in the back-and-forth direction.

The spool shaft coupled portion 24a is formed in a roughly cuboid shape and has a spool shaft attached hole 24e. The spool shaft attached hole 24e has a D-shaped cross-section and penetrates through the spool shaft coupled portion 24a in the back-and-forth direction. The rear end of the spool shaft 15 is fitted into the spool shaft attached hole 24e and is fixed thereto by, for instance, adhesive. Further, the rear end of the spool shaft 15 is also fixed by a screw member 37 to be screwed into the spool shaft 15. Accordingly, the rear end of the spool shaft 15 is fixed to the slider body 24.

The engaging member attached portion 24b is a roughly tubular portion having a through hole 24f. The through hole 24f is formed along the right-and-left direction arranged substantially perpendicular to the traverse cam shaft 21. The through hole 24f has a large-diameter portion 24g. The large-diameter portion 24g is thrilled on one end of the through hole 24f, i.e., the end disposed away from the traverse cam shaft 21. Further, the through hole 24f has a pair of restriction protrusions 24h (see FIG. 7). The restriction protrusions 24h are formed on the inner peripheral surface of the other end of the through hole 24f, i.e., the end disposed closer to the traverse cam shaft 21. The restriction protrusions 24h are exemplary restriction portions for restricting the axial moving of and the rotational range of the engaging member 25. Each restriction protrusion 24h has a predetermined thickness and is protruding in a circular-arc shape towards the axis of the through hole 24f. It should be noted that the engaging member attached portion 24b has a shaft mount portion 24i on the end surface closer to the traverse cam shaft 21, i.e., the end surface of the part that the restriction protrusions 24h are formed. The shaft mount portion 24i is recessed in a circular-arc shape and serves to dispose the traverse cam shaft 21 adjacently to the slider body 24.

The first guide portion 24c is protruding from the wall surface of the spool shaft coupled portion 24a, i.e, the wall surface closer to the traverse cam shaft 21. The first guide portion 24c has a first guide hole 24j that a first guide shaft 38a penetrates therethrough. The first guide shaft 38a serves to guide the slider 22 in the back-and-forth direction. The both ends of the first guide shaft 38a are supported by the chassis 2a. The second guide portion 24d is downwardly protruding from the bottom surface of the engaging member attached portion 24b. The second guide portion 24d has a second guide hole 24k that a second guide shaft 38b penetrates therethrough. The second. guide shaft 38b serves to guide the slider 22 in the back-and-forth direction. The both ends of the second guide shaft 38b are supported by the chassis 2a. Therefore, the traverse cam shaft 21 is disposed between the first guide shaft 38a and the second guide shaft 38b in the up-and-down direction.

The engaging member attached portion 24b has a mount surface 24m onto which the retainer member 27 is mounted. The mount surface 24m is formed on the end surface of the engaging member attached portion 24b, i.e., the end surface disposed away from the traverse cam shaft 21. The mount surface 24m is further recessed than the spool shaft coupled portion 24a. A screw attached portion 24n is circularly formed below the mount surface 24m. The screw member 28 is screwed into the screw attached portion 24n. The recessed depth of the mount surface 24m is greater than or equal to the thickness obtained by adding the thickness of a head portion 28a of the screw member 28 and that of the retainer member 27.

As illustrated in FIGS. 4 and 6, the engaging member 25 has a shaft part 25a and an engaging part 25b. The engaging part 25b is disposed on the tip end of the shaft part 25a. The engaging part 25b can be engaged with the helical grooves 21a. The engaging member 25 is a rod-shaped member made of metal. The engaging member 25 is disposed while the rear end of the shaft part 25a is protruding out of the through hole 24f. The shaft part 25a has a first shaft portion 25c and a second shaft portion 25d. The first shaft portion 25c extends to the engaging part 25b. The second shaft portion 25d extends to the first shaft portion 25c and has a diameter smaller than that of the first shaft portion 25c. The engaging part 25b has a disc portion 25e and an engaging piece 25f. The disc portion 25e is a large diameter portion to be fitted into the through hole 24f. The engaging piece 25f is formed in a plate shape and is protruding from the disc portion 25e towards the traverse cam shaft 21. The engaging piece 25f is engaged with the helical grooves 21a. The tip end of the engaging piece 25f is formed in a circular-arc shape along the bottom portions of the helical grooves 21a. The tip end of the engaging piece 25f is tapered. Specifically, the lateral surfaces (plate faces) of the engaging piece 25f are slanted at the tip end of the engaging piece 25f. A first surface 25g of the disc portion 25e, which is disposed closer to the traverse cam shaft 21, restricts the engaging member 25 from moving towards the traverse cam shaft 21 when making contact with the restriction protrusions 24h. Accordingly, the engaging part 25b is axially positioned, and the interval between the engaging part 25b and the traverse cam shaft 21 is kept constant. Further, the rotational range of the engaging member 25 is restricted when the both lateral surfaces of the engaging piece 25f make contact with the restriction protrusions 24h.

The first bearing 26 is disposed for rotatably supporting the shaft part 25a of the engaging member 25. For example, the first beating 26 is a tubular slide beating made of synthetic resin with a relatively high sliding performance (polyacetal resin, fluoropolymer, etc.). The first bearing 26 has a fitted part 26a, a protruding part 26b, and a support hole 26c. The fitted part 26a is fitted into the through hole 24f. The protruding part 26b has a diameter smaller than that of the fitted part 26a and is protruding out of the through hole 24f. The support hole 26c penetrates through the fitted part 26a and the protruding part 26b, and rotatably supports the shaft part 25a. The fitted part 26a has a large-diameter brimmed portion 26d on its boundary portion abutting the protruding part 26b. The brimmed portion 26d is engaged with the large-diameter portion 24g, and thereby, sets the position of the first bearing 26. Specifically, the brimmed portion 26d makes contact with the wall surface of the large-diameter portion 24g, and thereby, restricts the first bearing 26 from moving in a direction closer to the traverse cam shaft 21. Accordingly, the first bearing 26 is axially positioned. The support hole 26c has a first support hole portion 26e and a second support hole portion 26f. The first support hole portion 26e supports the first shaft portion 25c, whereas the second support hole portion 26f supports the second shaft portion 25d. The first support hole portion 26e is formed in a portion of the inner periphery of the fitted part 26a. The second support hole portion 26f is formed in the rest of the inner periphery of the fitted part 26a and the inner periphery of the protruding part 26b.

The retainer member 27 is mounted to the mount surface 24m, and thereby, presses and retains the first bearing 26. The fitted part 26a includes a stepped surface 26g at an end thereof which abuts the protruding part 26b. The retainer member 27 retains the first bearing 26 with the stepped surface 26g. The retainer member 27 is a plate-shaped member made of metal such as stainless alloy. The retainer member 27 has a passthrough hole 27a that the protruding part 26b can pass therethrough. The retainer member 27 is fixed to the slider body 24 by the screw member 28. The screw member 28 is screwed into the screw attached portion 24n of the slider body 24, while penetrating through the retainer member 27.

The second bearing 29 is, for instance, a rolling bearing such as a ball bearing or a roller bearing. The second bearing 29 is axially aligned with the first bearing 26 within the through hole 24f. Specifically, the second bearing 29 is disposed on the engaging part 25b side of the first bearing 26. In other words, the second bearing 29 is disposed between the first bearing 26 and the engaging part 25b. A washer member 39 is disposed between the first bearing 26 and the second bearing 29. The washer member 39 serves to suppress wobbling of the second bearing 29 in the axial direction. An outer race 29a of the second bearing 29 makes contact with the washer member 39. On the other hand, an inner race 29b of the second bearing 29 makes contact with a second surface 25h of the disc portion 25e of the engaging member 25, i.e., the surface disposed on the opposite side of the first surface 25g.

The intermediate gear 23 is meshed with the pinion gear 12 through a reduction mechanism 52. The intermediate gear 23 is attached to the front end of the traverse cam shaft 21 by non-circular coupling, while being unitarily rotatable therewith. The reduction mechanism 52 is configured to reduce the rotation of the pinion gear 12 and transmit the reduced rotation to the intermediate gear 23. The reduction mechanism 52 includes a first gear 53 and a second gear 54. The first gear 53 is meshed with the pinion gear 12. The second gear 54 is meshed with the intermediate gear 23. The second gear 54 is unitarily rotatable with the first gear 53. The number of gear teeth of the first gear 53 is greater than that of the pinion gear 12. The number of gear teeth of the second gear 54 is less than that of the intermediate gear 23. With the structures, the rotation of the pinion gear 12 is transmitted to the intermediate gear 23, while being reduced in two stages. The back-and-forth moving speed of the spool 4 is thereby reduced, and the fishing line can be densely wound about the bobbin trunk 4*a*. In the present exemplary embodiment, the first gear 53 is coupled to the second gear 54 by non-circular coupling, while being unitarily rotatable therewith. The second gear 54 is rotatably supported by a support shaft 55. The both ends of the support shaft 55 are supported by the front part of the chassis 2*a*. The first gear 53 and the pinion gear 12 are herein helical gears, whereas the intermediate gear 23 and the second gear 54 are spur gears.

As illustrated in FIG. 2, the spool shaft 15 is disposed while penetrating through the center part of the pinion gear 12. The spool shaft 15 is configured to be reciprocated back and forth in the inside of the pinion gear 12 by the oscillating mechanism 6. The intermediate portion of the spool shaft 15 is supported by a bearing 16 attached to the inside of the nut 13, while the rear portion of the spool shaft 15 is supported by the inner peripheral surface of the rear portion of the pinion gear 12. Accordingly, the spool shaft 15 is rotatably supported, while being axially movable.

Structure of Rotor

As illustrated in FIG. 2, the rotor 3 is rotatably supported by the reel unit 2 through the pinion gear 12. The rotor 3 includes a rotor body 30, a first cover member 32, a second cover member 33, and a bail arm 36. The rotor body 30 is coupled to the pinion gear 12, while being unitarily rotatable therewith.

The rotor body 30 includes a coupling part 30*a*, a first rotor arm 30*b*, and a second rotor arm 30*c*. The coupling part 30*a* is a closed-end tubular part rotatably coupled to the reel unit 2 through the pinion gear 12. The first rotor arm 30*b* is forwardly extending from a first side (upper side in FIG. 2) of the rear end portion of the coupling part 30*a*, while being away from the coupling part 30*a* at an interval. The second rotor arm 30*c* is forwardly extending from a second side (lower side in FIG. 2), which is opposite to the first side, of the rear end portion of the coupling part 30*a*, while being away from the coupling part 30*a* at an interval. The rotor body 30 is made of either aluminum alloy or magnesium alloy, for instance, and is integrally molded.

The coupling part 30*a* has a wall portion 31*a* formed in the front part thereof. The wall portion 31*a* has a boss 31*b* in the center part thereof. The boss 31*b* has a through hole 31*c* bored in the center part thereof. The front portion 12*a* of the pinion gear 12 and the spool shaft 15 penetrate through the through hole 31*c*. The nut 13 is disposed in front of the wall portion 31*a*. The rotor 3 is fixed to the pinion gear 12 by the nut 13. The coupling part 30*a* has a recessed portion 31*d* formed in the rear part thereof. The recessed portion 31*d* has a circular space in which the front part of the reel unit 2 can be accommodated.

The first cover member 32 covers the radially outside of the first rotor arm 30*b*. A bail flip mechanism (not illustrated in the figures) is mounted between the first cover member 32 and the first rotor arm 30*b*. The bail flip mechanism is configured to selectively urge the bail arm 36 between a fishing-line winding position and a fishing-line releasing position.

As illustrated in FIG. 2, the bail arm 36 is attached to the tip ends of the first and second rotor arms 30*b* and 30*c*, while being pivotable between the fishing-line releasing position and the fishing-line winding position. When set in the fishing-line winding position, the bail arm 36 is configured to wind the fishing line onto the spool 4 by the rotation of the rotor 3 in the fishing-line winding direction.

The bail arm 36 includes a first bail support member 40, a second bail support member 42, and a line roller 41. The first bail support member 40 is pivotably attached to the outer peripheral side of the tip end of the first rotor arm 30*b*. The second bail support member 42 is pivotably attached to the outer peripheral side of the tip end of the second rotor arm 30*c*. The line roller 41 is rotatably attached to the tip end of the first bail support member 40. Further, the bail arm 36 includes a stationary shaft (not illustrated in the figures), a stationary shaft cover 44, and a bail 45. The stationary shaft is a member for supporting the line roller 41. The stationary shaft is fixed to the tip end of the first bail support member 40, while being cantilevered by the first bail support member 40. The stationary shaft cover 44 is disposed on the tip-end side of the stationary shaft. The bail 45 couples the stationary shaft cover 44 and the second bail support member 42.

Other Structures

As illustrated in FIG. 2, an anti-reverse mechanism 50, which is configured to prevent the reverse rotation of the rotor 3, is disposed in the interior of the tubular portion 2*f* of the reel unit 2. The anti-reverse mechanism 50 includes a one-way clutch 51. The one-way clutch 51 is of a roller type with a free-wheeling inner race. The anti-reverse mechanism 50 is configured to constantly prevent the rotor 3 from rotating reversely (i.e., in the fishing-line releasing direction). Therefore, the anti-reverse mechanism 50 never allows the reverse rotation of the rotor 3. It should be noted that the anti-reverse mechanism 50 can be configured to be switchable between a reverse rotation allowed state and a reverse rotation prevented state. The anti-reverse mechanism 50 is retained by a cap member 20 fixed to the tubular portion 2*f*. For example, the cap member 20 is screwed onto the outer peripheral surface of the tubular portion 2*f*.

As illustrated in FIG. 2, the spool is disposed between the first and second rotor arms 30*b* and 30*c* of the rotor 3. The spool 4 is rotatably supported by the tip end of the spool shaft 15. The spool 4 is configured to be moved back and forth together with the spool shaft 15, and simultaneously, the fishing line is wound onto the outer periphery of the bobbin trunk 4*a* by the rotor 3. The spool 4 is made of for instance, aluminum alloy. The spool 4 accommodates the drag mechanism 60 in the interior thereof. The drag mechanism 60 is configured to brake the spool 4 for applying a set amount of drag three to the spool 4.

As illustrated in FIG. 2, the drag mechanism 60 is configured to brake the rotation of the spool 4 in the fishing-line releasing direction in order to apply drag force to the spool 4. The drag mechanism 60 includes a drag knob assembly 65 and a friction part 66. The drag knob assembly 65 is provided for manually regulating drag force. The friction part 66 is configured to be pressed towards the spool 4 by the drag knob assembly 65, and thereby, drag force is regulated. The drag knob assembly 65 is disposed in front of the spool 4. The friction part 66 is disposed in the interior of the spool 4.

Action of Oscillating Mechanism

When the handle 1 is rotated in the spinning reel 100 structured as described above, the drive shaft 10 is rotated and the pinion gear 12 meshed with the drive gear 11 is rotated. When the pinion gear 12 is rotated, the rotor 3 is rotated. Accordingly, the intermediate gear 23 is rotated through the reduction mechanism 52, and the traverse cam shaft 21 is rotated. When the traverse cam shaft 21 is rotated, the engaging part 25b of the engaging member 25 attached to the slider body 24 is engaged with the helical grooves 21a, and is rotated and moved back and firth by the action of the helical grooves 21a. The slider 22 is thereby reciprocated back and forth, and the spool 4 is moved back and forth. The first bearing 26 is herein retained by the retainer member 27 not at the end thereof but at the step thereof produced between the fitted part 26a and the protruding part 26b. Therefore, the axial length of the shaft part 25a of the engaging member 25 can be increased as much as possible without increasing the width of the slider body 24, i.e., the length of the slider body 24 in the tight-and-left direction. Hence, the engaging member 25 can be prevented from easily wobbling even when the engaging member 25 is rotated to a great extent at the both ends of the helical grooves 21a.

Other Exemplary Embodiments

An exemplary embodiment of the present invention has been described above. However, the present invention is not limited to the aforementioned exemplary embodiment, and a variety of changes can be made without departing from the scope of the present invention. Especially, a plurality of exemplary embodiments and modifications described in the present specification can be arbitrarily combined on an as-needed basis. In should be noted that in the following description of other exemplary embodiments, explanation will be made for components structured differently from the corresponding ones of the aforementioned exemplary embodiment while three-digit reference numbers are assigned to the components. The three-digit reference numbers, which are assigned to the components of the following exemplary embodiments, are produced by changing reference numbers assigned to the corresponding components of the aforementioned exemplary embodiment. Further, explanation will be omitted for such components that are similar to those of the aforementioned exemplary embodiment.

Figure 8:
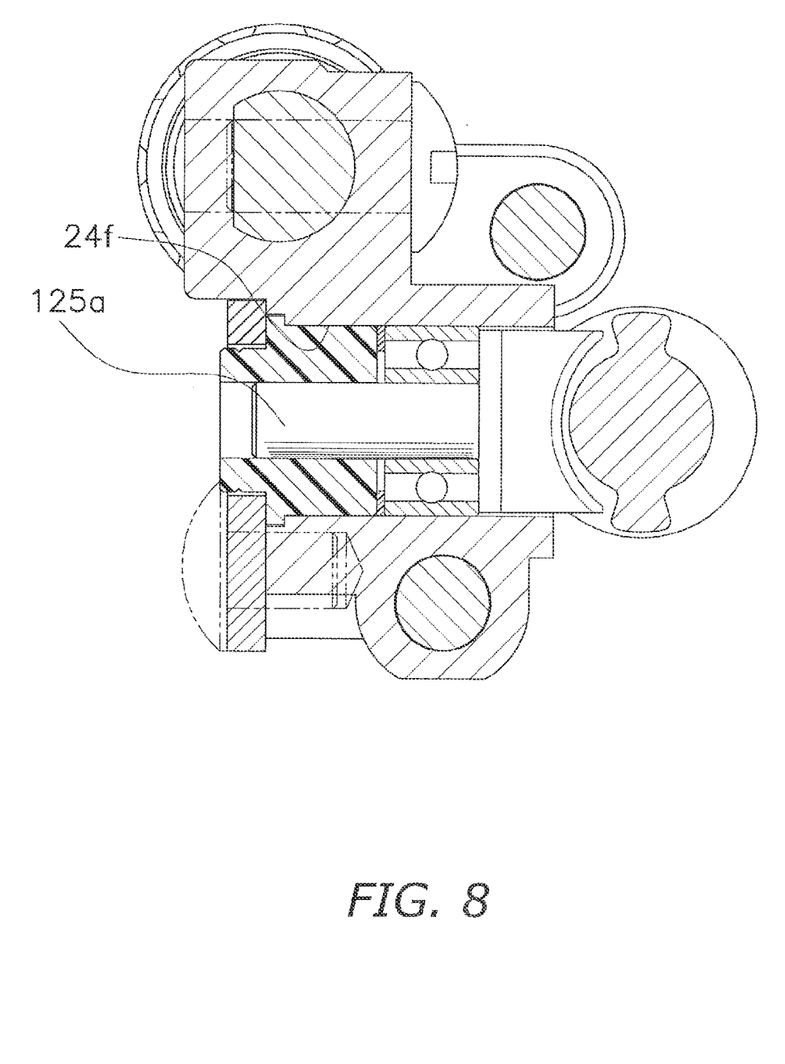
FIG. 8 is a diagram corresponding to FIG. 5 in another exemplary embodiment.

(a) In the aforementioned exemplary embodiment, the shaft part 25a of the engaging member 25 is composed of the first shaft portion 25c and the second shaft portion 25d. However, the present invention is not limited to the structure. As illustrated in FIG. 8, a shaft part 125a can be formed with a constant diameter. In this case, a first bearing, which is made of synthetic resin, can be disposed in the through hole 24f over the roughly entire length of the through hole 24f without providing a second bearing.

Figure 9:
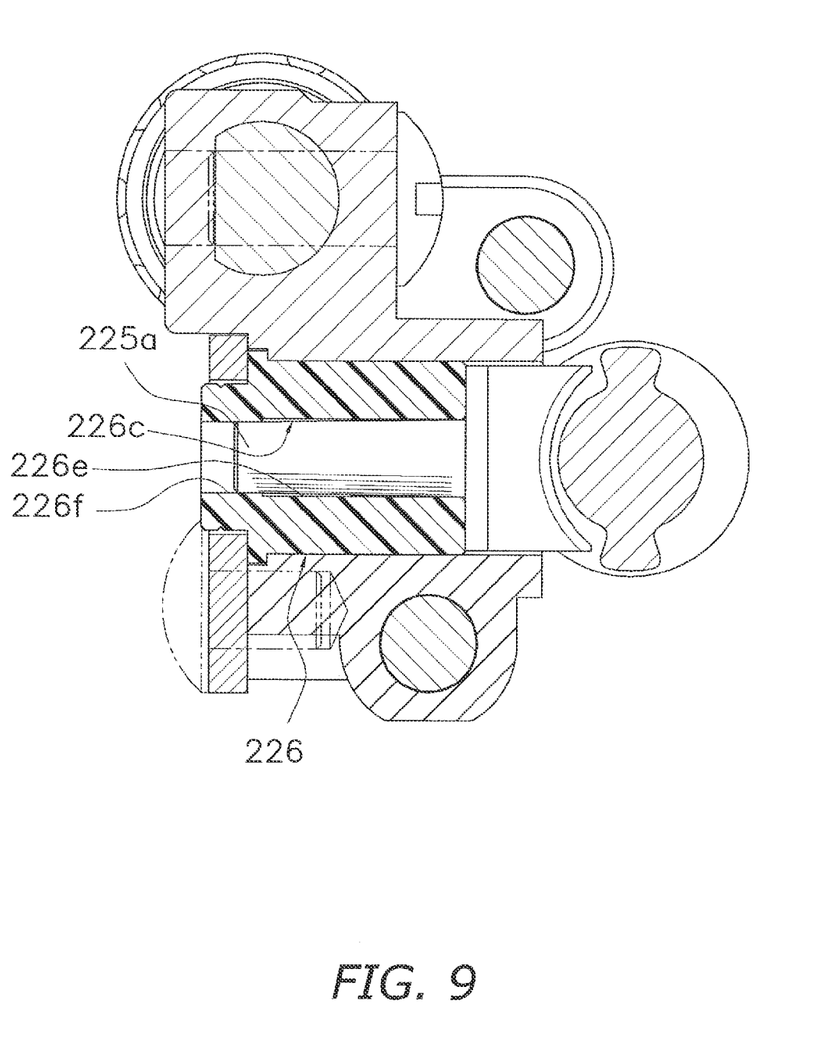
FIG. 9 is a diagram corresponding to FIG. 5 in yet another exemplary embodiment.

(b) As illustrated in FIG. 9, only a first bearing 226 can be provided for supporting a shaft part 225a without providing a second bearing. The first bearing 226 is herein disposed in the through hole over the roughly entire length of the through hole. Further, a shaft part 226a is tapered towards the tip end thereof such that the protruding side thereof has a smaller diameter. Especially when barrel polishing is performed after machining of the engaging member for the purposes of deburring, removal of cutting marks, and so froth, the shaft part 25a is preferably composed of the first shaft portion 25c and the second shaft portion 25d having a diameter smaller than the first shaft portion 25c as illustrated in FIG. 6, or alternatively, the shaft part 225a is preferably formed in a tapered shape as illustrated in FIG. 9. Thus, even when the diameter of the tip end side becomes smaller than that of the engaging part side in the shaft part 225a as a result of barrel polishing, this does not negatively affect too much the structure of supporting the shaft part 225a only by the first bearing 226.

In the exemplary embodiment illustrated in FIG. 9, a support hole 226c of the first bearing 226 is composed of a first support hole portion 226e and a second support hole portion 226f having a diameter slightly smaller than that of the first support hole portion 226e. The shaft part 225a is supported by the end, which is closer to the engaging part 25b, of the first bearing 226 and the boundary between the first support hole portion 226e and the second support hole portion 226f.

(c) In the aforementioned exemplary embodiment, the first bearing 26 is provided with the large-diameter brimmed portion 26d. However, the first bearing 26 is not required to be provided with such brimmed portion. In this case, the washer member 39 and the second bearing 29 can be configured to be pressed by the retainer member 27 through the first bearing 26.

(d) In the aforementioned exemplary embodiment, the present invention has been explained by exemplifying the spinning reel 100 of a front drag type that the spool shaft 15 is non-rotatably coupled to the slider body 24. However, the object to which the present invention is applied is not limited to the spinning reel 100. For example, the present invention is similarly applicable to a spinning reel of a rear drag type that the spool shaft is coupled to the slider body while being rotatable and axially immovable and a spinning reel configured to switch activation of a front drag mechanism and that of a rear drag mechanism by a switch member. Further, the present invention is also applicable to a spinning reel of a lever brake type configured to brake not the spool but the rotor.

(e) In the aforementioned exemplary embodiment, the screw member 28 has been exemplified as a fixation member. However, the fixation member is not limited to the screw member 28 in the present invention. For example, an elastic engaging pin can be used as the fixation member. The elastic engaging pin is herein elastically engaged with the slider body 24.

Features

The aforementioned exemplary embodiments can be expressed as follows.

(A) The spinning reel 100 is a reel configured to forwardly reel out the fishing line. The spinning reel 100 includes the handle 1, the reel unit 2, the rotor 3, the spool 4, the spool shaft 15, and the oscillating mechanism 6. The reel unit 2 rotatably supports the handle 1. The rotor 3 is rotatably supported by the reel unit 2. The spool 4 has the bobbin trunk 4a that the fishing line is wound thereabout by the rotor 3. The spool shaft 15 is a member that the spool 4 is mounted. The oscillating mechanism 6 is configured to reciprocate the spool 4 in the back-and-forth direction by the rotation of the handle 1. The oscillating mechanism 6 includes the traverse cam shaft 21 and the slider 22. The traverse cam shaft 21 has the intersecting helical grooves 21a on the surface thereof. The traverse cam shaft 21 is disposed in parallel to the spool shaft 15. The traverse cam shaft 15 is configured to be rotated in conjunction with the rotation of the handle 1. The slider 22 includes the slider body 24, the engaging member 25, the first bearing 26, the retainer member 27, and the screw member 28. The slider body 24 has the through hole 24f penetrating therethrough in the direction perpendicular to the traverse can shaft 21. The slider body 24 is coupled to the spool shaft 15 so as to be unitarily movable therewith at least in the axial direction. The engaging member 25 has the shaft part 25a and the engaging part 25b. The engaging part 25b is mounted to the tip end of the shaft part 25a so as to be capable of being engaged with the helical grooves 21a. The engaging member 25 is formed in a rod shape such that the rear end of the shaft part 25a is protruding out of the through hole 24f. The first bearing 26 has the fitted part 26a, the protruding part 26b and the support hole 26c. The fitted part 26a is fitted into the through hole 24f. The protruding part 26b has a diameter smaller than that of the fitted part 26a. The protruding part 26b is protruding out of the through hole 24f. The support hole 26c penetrates through the fitted part 26a and the protruding part 26b. The support hole 26c serves to support rotatably the shaft part 25a. The retainer member 27 retains the first bearing 26 at the stepped surface 26g produced in the boundary between the fitted part 26a and the protruding part 26b. The screw member 28 fixes the retainer member 27 to the slider body 24.

In the spinning reel 100, the first bearing 26 of the oscillating mechanism 6 is retained by the retainer member 27 not at the end of the first bearing 26 but at the stepped surface 26g. With the structure, the shaft part 25a of the engaging member 25 is supported by the support hole 26c bored inside the fitted part 26a and the protruding part 26b. The length of the shaft part 25a can be thereby set regardless of the width of the slider body 24. Thus, the length of the shaft part 25a of the engaging member 25 can be increased as much as possible without increasing the width of the slider body 24.

(B) In the spinning reel 100, the fixation member is the screw member 28 having the head portion 28a. In this case, by denting the part to which the retainer member 27 is attached, chances can be reduced that the head portion 28a of the screw member 28 is protruding from the slider body 24.

(C) In the spinning reel 100, a part of the slider body 24 for disposing the retainer member 27 is further recessed than another part of the slider body 24 for coupling the spool shaft 15. In this case, by setting the recessed depth to be greater than the thickness of the head portion 28a, chances can be reduced that the head portion 28a of the screw member 28 is protruding from the slider body 24. Accordingly, the slider 22 can be disposed closer to the drive gear 11 as much as possible. Consequently, the drive gear 11 can be firmed with a large diameter without forming the reel unit 2 with a large size.

(D) in the spinning reel 100, the retainer member 27 is a plate-shaped member having the pass-through hole 27a. The pass-through hole 27a allows the protruding part 26b to pass therethrough. Further, the slider body 24 has the mount surface 24m allowing the retainer member 27 to be mounted thereto. In this case, the retainer member 27 can be easily fabricated because the retainer member 27 is a plate-shaped member. Further, the slider body 24 can be also easily formed because the part on which the retainer member 27 is mounted is a flat surface.

(E) In the spinning reel 100, the first bearing 26 is a slide beating made of synthetic resin. In this case, the fitted part 26a and the protruding part 26b having a diameter smaller than that of the fitted part 26a can be easily formed by die forming.

(F) In the spinning reel 100, the shaft part 25a has the first shaft portion 25c and the second shaft portion 25d. The first shaft portion 25c extends to the engaging part 25b. The second shaft portion 25d extends to the first shaft portion 25c. The second shaft portion 25d has a diameter smaller than that of the first shaft portion 25c. Further, the support hole 26c has the first support hole portion 26e and the second support hole portion 26f. The first support hole portion 26e supports the first shaft portion 25c. The second support hole portion 26f supports the second shaft portion 25d. In this case, the shaft part 25a is composed of the first shaft portion 25e and the second shaft portion 25d. The first shaft portion 25c has a large diameter and is disposed closer to the engaging part 25b, whereas the second shaft portion 25d has a small diameter and is disposed away from the engaging part 25b. Therefore, even when the shaft part 25a is slanted, resistance against the rotation of the engaging member 25 is reduced.

(G) in the spinning reel 100, the first support hole portion 26e is disposed in a part of the inner periphery of the fitted part 26a, whereas the second support hole portion 26f is disposed in the rest of the inner periphery of the fitted part 26a and the inner periphery of the protruding part 26b. In this case, the boundary between the first support hole portion 26e and the second support hole portion 26f is disposed closer to the engaging part 25b than the boundary between the fitted part 26a and the protruding part 26b is. Therefore, the first bearing 26 can be accurately formed when being made of synthetic resin or the like.

(H) In the spinning reel 100, the fitted part 26a has the brimmed portion 26d with a large diameter on its boundary portion abutting the protruding part 26b. Further, the through hole 24f has the large-diameter portion 24g allowing the brimmed portion 26d to be engaged therewith. In this case, the brimmed portion 26d makes contact with the wall surface of the large-diameter portion 24g, and thereby, the first bearing 26 can be restricted from moving in the direction closer to the engaging part 25b.

(I) In the spinning reel 100, the engaging part 25b has the disc portion 25e and the engaging piece 25f. The disc portion 25e has a diameter larger than that of the shaft part 25a. The engaging piece 25f is formed in a plate shape and is protruding from the disc portion 25e towards the traverse cam shaft 21. The engaging piece 25f is engaged with the helical grooves 21a. Further, the through hole 24f has the restriction protrusions 24h. The restriction protrusions 24h restrict the engaging member 25 from moving in the direction closer to the traverse cam shaft 2 by making contact with the disc portion 25e. Further, the restriction protrusions 24h restrict the rotational range of the engaging member 25 by making contact with the lateral surface of the engaging piece 25f. In this case, the restriction protrusions 24h can restrict the distance between the engaging member 25 and the traverse cam shaft 21 to be within a predetermined range, and can also restrict the rotational range of the engaging member 25.

(J) In the spinning reel 100, the slider 22 further includes the second hearing 29. The second bearing 29 is disposed on the engaging part 25b side of the first bearing 26 within the through hole 24f so as to be axially aligned with the first bearing 26. The second bearing 29 rotatably supports the shaft part 25a within the through hole 24f. In this case, the shaft part 25a is supported by the first bearing 26 and the second bearing 29 that are axially disposed in alignment with each other. Therefore, the shaft part 25a can be further smoothly rotated.

(K) In the spinning reel 100, the second bearing 29 is a rolling bearing. In this case, the shaft part 25a can be further smoothly rotated, because the second bearing 29 is a rolling bearing.

Advantageous Effects of Invention

According to the present invention, the first bearing of the oscillating mechanism is retained by the retainer member not at the end of the first bearing but at the stepped surface 26g. With the structure, the shaft part of the engaging member is supported by the support hole bored in the fitted part and the protruding part. Accordingly, the length of the shaft part can be set regardless of the width of the slider body. Therefore, the length of the shaft part of the engaging member can be increased as much as possible without increasing the width of the slider body.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spinning reel being configured to forwardly reel out a fishing line, comprising:
    a handle;
    a reel unit rotatably supporting the handle;
    a rotor being rotatably supported by the reel unit;
    a spool having a bobbin trunk about which the fishing line is wound by the rotor;
    a spool shaft on which the spool is mounted; and
    an oscillating mechanism being configured to reciprocate the spool in a back-and-forth direction by a rotation of the handle,
    the oscillating mechanism including a traverse cam shaft and a slider,
    the traverse cam shaft having intersecting helical grooves on a surface thereof, the traverse cam shaft being disposed in parallel to the spool shaft, the traverse cam shaft being configured to be rotated in conjunction with the rotation of the handle, and
    the slider including
        a slider body having a through hole penetrating therethrough in a direction perpendicular to the traverse cam shaft, the slider body being coupled to the spool shaft to be unitarily movable therewith at least in an axial direction,
        an engaging member having a shaft part and an engaging part, the engaging part being mounted to a tip end of the shaft part to be engaged with the helical grooves, the engaging member being formed in a rod shape such that a rear end of the shaft part protrudes out of the through hole of the slider body,
        a first bearing having a fitted part, a protruding part, and a support hole, the fitted part being fitted into the through hole, the protruding part having a diameter smaller than a diameter of the fitted part, the fitted part including a stepped surface on an end thereof abutting the protruding part, the protruding part protruding out of the through hole, the support hole penetrating through the fitted part and the protruding part, the support hole rotatably supporting the shaft part,
    a retainer member retaining the first bearing at the stepped surface, and
    a fixation member fixing the retainer member to the slider body.

2. The spinning reel according to claim 1, wherein the fixation member is a screw member having a head portion.

3. The spinning reel according to claim 2, wherein a first part of the slider body for disposing the retainer member is further recessed than a second part of the slider body for coupling the spool shaft.

4. The spinning reel according to claim 3, wherein the retainer member is a plate-shaped member having a pass-through hole,
    the pass-through hole allows the protruding part to pass through the pass-through hole, and
    the slider body has a mount surface allowing the retainer member to be mounted thereto.

5. The spinning reel according to claim 1, wherein the first bearing is a slide bearing made of synthetic resin.

6. The spinning reel according to claim 1, wherein the shaft part has a first shaft portion and a second shaft portion,
    the first shaft portion extends to the engaging part,
    the second shaft portion extends to the first shaft portion,
    the second shaft portion has a diameter smaller than a diameter of the first shaft portion,
    the support hole has a first support hole portion and a second support hole portion,
    the first support hole portion supporting the first shaft portion, and
    the second support hole portion supports the second shaft portion.

7. The spinning reel according to claim 6, wherein the first support hole portion is disposed in a part of an inner periphery of the fitted part, and
    the second support hole portion is disposed in the rest of the inner periphery of the fitted part and an inner periphery of the protruding part.

8. The spinning reel according to claim 1, wherein the fitted part has a brimmed portion with a large diameter on a boundary portion thereof abutting the protruding part, and
    the through hole has a large-diameter portion allowing the brimmed portion to be engaged therewith.

9. The spinning reel according to claim 1, wherein the engaging part has a disc portion and an engaging piece,
    the disc portion has a diameter larger than a diameter of the shaft part,
    the engaging piece is formed in a plate shape,
    the engaging piece protrudes from the disc portion towards the traverse cam shaft,
    the engaging piece is engaged with the helical grooves, and
    the through hole has a restriction portion, the restriction portion is configured to restrict the engaging member from moving in a direction closer to the traverse cam shaft by making contact with the disc portion, and the restriction portion is configured to restrict a rotational range of the engaging member by making contact with a lateral surface of the engaging piece.

10. The spinning reel according to claim 1, wherein the slider further includes a second bearing, the second bearing is disposed on the engaging part side of the first bearing within the through hole to be axially aligned with the first bearing, and the second bearing rotatably supports the shaft part within the through hole.

11. The spinning reel according to claim 10, wherein the second bearing is a rolling bearing.

* * * * *